April 17, 1962  W. G. LOHMEYER  3,030,169
TRANSACTION-RECORDING CAMERA
Filed Oct. 30, 1958  4 Sheets-Sheet 1

WALTER G. LOHMEYER
INVENTOR.

BY Homer L Montague
ATT'Y.

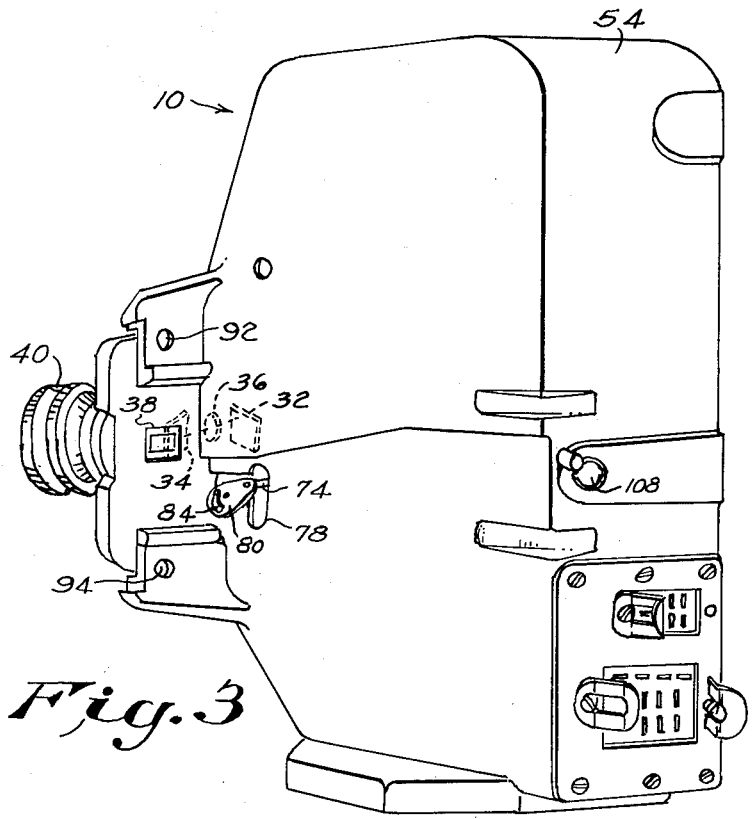
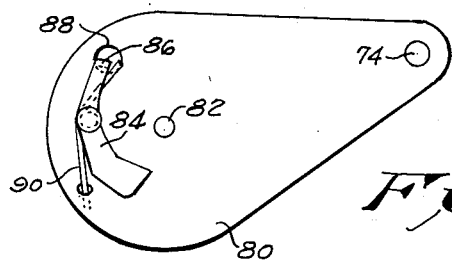

April 17, 1962 W. G. LOHMEYER 3,030,169
TRANSACTION-RECORDING CAMERA
Filed Oct. 30, 1958 4 Sheets-Sheet 3

WALTER G. LOHMEYER
INVENTOR.

BY
Homer R. Montague
ATT'Y.

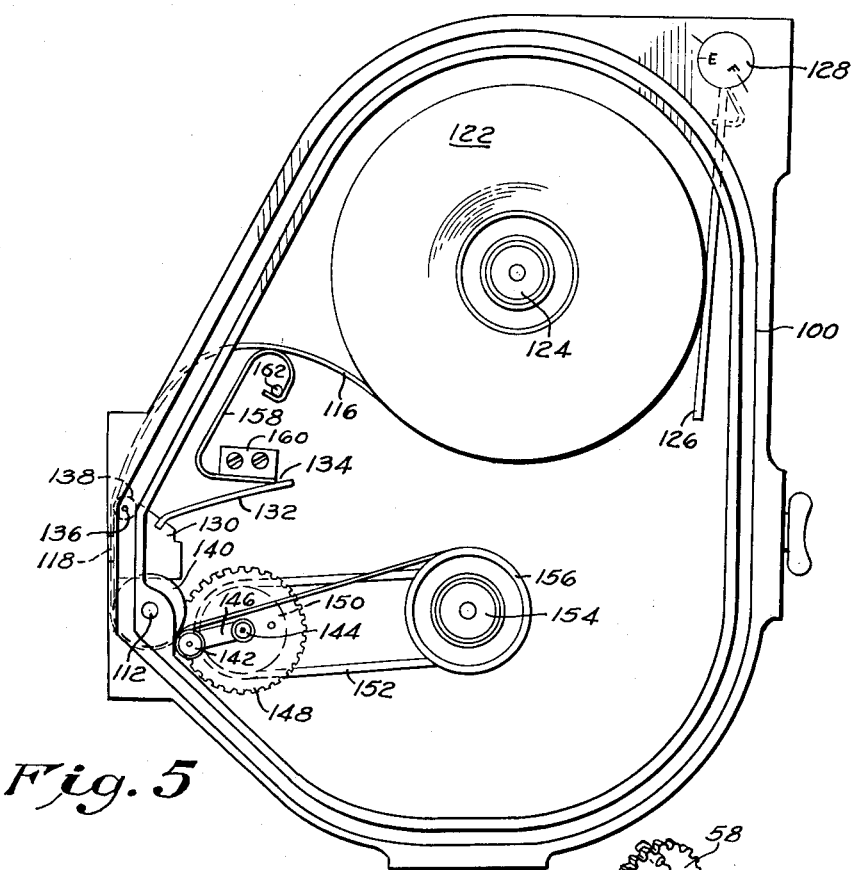

United States Patent Office 3,030,169
Patented Apr. 17, 1962

3,030,169
TRANSACTION RECORDING CAMERA
Walter G. Lohmeyer, Mineola, N.Y., assignor to Fairchild Camera and Instrument Corporation, a corporation of Delaware
Filed Oct. 30, 1958, Ser. No. 770,728
6 Claims. (Cl. 346—107)

The present invention pertains generally to photographic camera equipment, and more particularly to photographic recording installations which provide a permanent photographic record of persons or objects such as automobiles which pass through a controlled area, along with significant data pertaining to the particular scene being recorded.

In the monitoring of the passage of personnel or objects past a check point or through a controlled area it is often advantageous to provide a permanent record of not only the visual characteristics of the person or object passing such point, but to also provide as a part of that record a display of certain data which pertain to the particular transaction or passage. Among other applications, the provision of such recordings is often desirable in the monitoring of personnel entering and leaving a building, the control of aircraft landings and takeoffs at an airport, and the monitoring of the tolls paid at the toll booths of shipping canals and automobile toll roads. Usually the associated or related data which would be made a part of the several recordings made at a given installation would include such information as the day of the year and the time of day, along with a transaction serial number and the serial number of the particular installation or toll booth, and, where applicable, the amount of the toll paid.

For the purposes of explanation herein, the apparatus of the invention will be described in connection with the operation of a highway toll booth through which automobiles, buses and trucks pass after payment of an appropriate toll which usually is determined in accordance with the number of passengers, the number of axles (in the case of trucks) and the like. In this particular application is it generally desirable to record along with a picture of the front and one side of the vehicle information as to the number of the particular toll station and the vehicle lane number, the time and date, the transaction number affording a count of the number of vehicles passing within a given time period), and the dollar amount of the toll paid. Since the photograph of the front and side of the vehicle usually provides all the information necessary to determine the proper amount of the toll, the composite record allows a subsequent check of the accuracy of the toll booth operator. In addition to having a selectively changeable data display device for displaying such related information in such manner that an image thereof may be focused at an exposure aperture along with the image of the vehicle, the camera in such a toll booth installation should be adapted to remotely controlled operation, must necessarily be weatherproof and have a large storage capacity in order to avoid the necessity of frequent film supply changing, and should have a short re-cycle time between exposures as well as automatic control of the amount of the exposure in accordance with the ambient light level.

It is accordingly a primary object of the present invention to provide a camera adapted to photograph both a selected visual scene and a data display device which displays information related to such scene, with the images of the scene and the data display device being focused on separate portions of a common frame of the photographic film employed.

It is another object of the invention to provide a camera of the above type which is adapted to be controlled from a remote point both as to time of exposure initiation and to the particular data which are displayed on the data display device therein.

Another object of the invention is to provide a camera of the above type which includes a simplified shutter mechanism which affords long periods of use without the necessity of a great amount of maintenance.

Still another object of the present invention is to provide a camera of the above type wherein once the appropriate display information is introduced into the apparatus, the remainder of the operational cycle including the initiation of exposure, the amount of the exposure, film transport and resetting for the next exposure is completely automatic.

A further object of the invention is to provide a camera of the above type including a film magazine and employing a greatly simplified drive connection between the motive power source in the main housing and the film transport mechanism in the magazine.

In accordance with the present invention, the above and other objects are achieved by means of a camera having a film magazine and a main housing, the latter including a remotely-controlled data display device and a remotely-controlled shutter mechanism and film transport drive means. Means are provided within the main housing to illuminate the data display device and to focus an image of the display on a portion of an exposure aperture with respect to which successive frames of photographic film are brought into registry by means of a film transport mechanism in the film magazine. Other optical means are provided to focus on another portion of the exposure aperture the image of the scene to be recorded and to which the data display pertain. Both the information display and the motive power source for the shutter and film transport mechanisms are electrically operated, and respective electrical control means are provided at remotely positioned points to introduce into the data display the desired information and then to initiate the shutter action. After an exposure is thus made, the film transport mechanism is actuated to bring a subsequent frame of the unexposed film into registry with the exposure frame, and the shutter is re-set for the next exposure.

The improved and simplified shutter mechanism of the present invention comprises a pair of planar, opaque plates each of which has an aperture therein of the same size and shape as the exposure aperture in the main housing of the camera. A first of the two plates is springbiased toward an exposure aperture closing position, but is held against the action of such spring by a suitable latch, the aperture in the first plate being in registry with the exposure aperture when the plate is thus latched. The second plate is continuously engaged by the shutter drive means of the main camera housing, and when it is moved from an initial position in which it serves to close the exposure aperture to a second limit position in which the aperture therein is in substantial registry with the exposure aperture, a cam means on the second plate operates to release the latch from the first plate, allowing the first plate to slide into its exposure-terminating position under the influence of the bias spring. After completion of the exposure in this manner, the shutter drive means also engages the first plate to bring the two plates back into their initial positions in a capped or shutter-closed relationship.

A magazine-receiving wall of the main camera housing is adapted to receive a mating wall of the magazine, which magazine is releasably secured to the main housing by suitable fasteners preferably of the quick-connect type. A film transport drive means is mounted on the magazine-receiving wall of the main housing, and is there mounted for oscillatory movement in a plane substantially parallel to the magazine-receiving wall. A cooperating driven member is similarly mounted on the mating wall of the magazine, and is driven incrementally thereby to provide intermittent operation of the film transport mechanism which is connected thereto. Such transverse engagement of the driving and driven members between the main housing and the magazine rather than the more common axial engagement of the two avoids the necessity of careful alignment of the two axles in order to achieve proper drive connection.

With the above considerations and objects in mind, the invention itself will now be described in connection with a preferred embodiment thereof given by way of example and not of limitation, and with reference to the accompanying drawings, in which:

FIG. 3 is a perspective view of the other side of the main housing of the apparatus of the invention.

FIG. 3A is a fragmentary side elevation to a larger scale of a portion of the apparatus shown in FIG. 3.

FIG. 5 is a side elevation of the other side of the film magazine of the apparatus of the invention, with a cover plate removed.

FIG. 6 is an exploded perspective view of the main elements of the shutter mechanism of the apparatus of the invention, seen in part in side elevation in FIG. 2.

Figure 1:
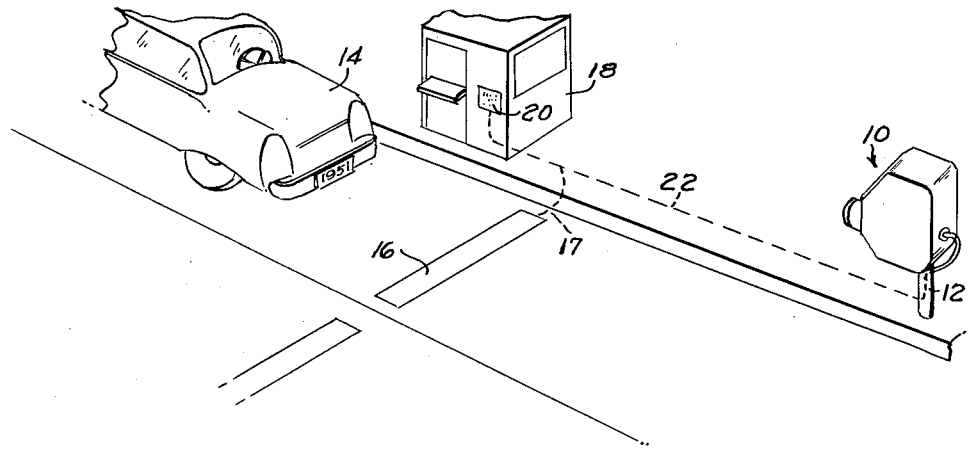
FIG. 1 is a perspective view of a typical installation employing the apparatus of the present invention.

Referring now to FIG. 1 in particular, the camera of the present invention is indicated generally at 10, being mounted on a suitable post or support 12 in such manner as to include in the field of view an automobile 14 when the latter is in the position of the treadle 16 which serves as the operating switch for the shutter mechanism of camera 10 as will further be described. The tool station 18 includes a transaction register 20, which may be of any suitable type which provides an electrical output corresponding to the information registered. Normally the information which is introduced into the register includes the number of the toll booth, the number of the particular lane, the time and date, the serial number of the particular transaction, and the dollar amount of the toll paid. Such information is normally punched or otherwise made a part of a tabulating card or the like which is individual to each of the several vehicles passing the toll station. In accordance with the present invention, such record card may still be employed, so long as the register 20 also provides an appropriate electrical output to be applied to the data display unit of camera 10 through cable 22.

Figure 2:
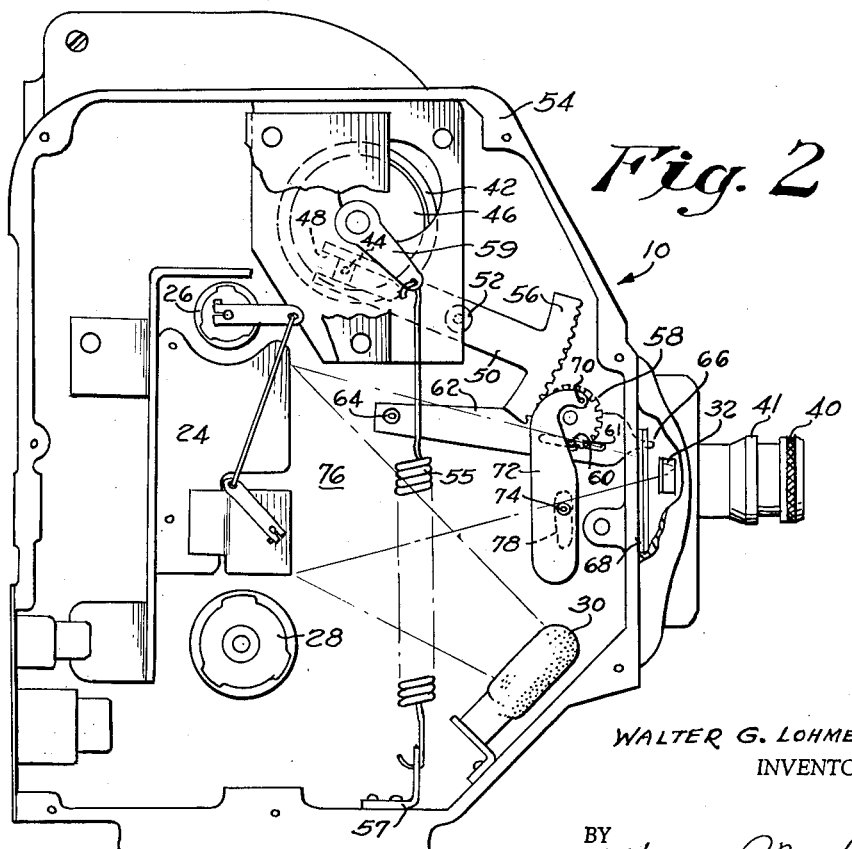
FIG. 2 is a side elevation of one side of the main housing of the apparatus of the invention, with a cover plate removed and other portions being broken away for clarity.

The data display unit of camera 10 is indicated generally at 24 in FIG. 2, and may be one of several suitable types commercially available at present. Suitable electromagnetic operators 26 and 28 are provided for respective portions of the changeable display device, which may take the form of indicia-bearing rotary wheels, color or position coded lights or the like. One or more lamps 30 serve to illuminate the faces of the several sections of the data display unit 24, and an image of such faces is reflected by a first mirror 32 in a direction substantially perpendicular to the sheet of paper of FIG. 2. This reflected light then impinges upon a second mirror 34 (seen in FIG. 3), which reflects the light in a direction substantially parallel to the original light rays from the display faces but in the opposite direction. In this manner the images of the display faces are focused at the right-hand portion of an exposure aperture 38 (FIG. 3) by a suitable lens system 36. The usual camera lens system for focusing the image of the automobile at the remaining portion of exposure aperture 38 is indicated generally at 40, and may be any of several suitable types, depending upon the particular field size and depth of field desired at a given installation. An automatic exposure control means 41 of any well-known type is employed to automatically adjust the step in response to changes in the ambient light level in the field of view.

A rotary solenoid 42 or the like provides the motive power for operation of both the shutter mechanism and the film transport of the camera, both to be described in more detail in connection with subsequent figures of the drawings. A shaft or stud 44 positioned near the periphery of the rotary element 46 of solenoid 42 is slidably received in slot 48 of rocker arm 50 which is pivotally mounted at 52 on the main housing 54 of camera 10. A resilient member 55, such as a coil spring or the like, is connected between a bracket 57 and the free end of an arm 59 which is secured to rotary element 46. Spring 55 pulls on arm 59 to provide a return stroke after an energization cycle of solenoid 42. The remaining end of arm 50 is formed as a sector gear 56, which sector engages a spur gear 58 serving as a double crank. One of the crank pins of gear 58 is indicated at 60, and is slidably received in a slot 61 in a shutter-actuating drive member 62 which is mounted at 64 for pivotal movement with respect to main housing 54. The remaining end of drive member 62 is necked-down into a tip 66 which is secured to one of the blades 68 of the shutter assembly, as will be described in more detail in connection with FIG. 6.

The remaining crank pin 70 on spur gear 58 is secured to an arm 72 which is mounted for pivotal movement about a pin 74, the latter extending through the magazine-receiving wall 76 of main housing 54 and being constrained to reciprocal movement in slot 78 therein, as may better be seen in FIG. 3. A pivotal drive member 80, shown in greater detail in FIG. 3A, is connected to the extending end of pin 74, and is mounted for pivotal movement about an axis 82. Pivotally mounted on member 80 is a pawl 84 having a tab or ear 86 extending into an aperture 88 in member 80 so as to limit the relative movement between the two. A spring member 90 is provided to bias pawl 84 in a counterclockwise direction as viewed in FIG. 3A.

Figure 4:
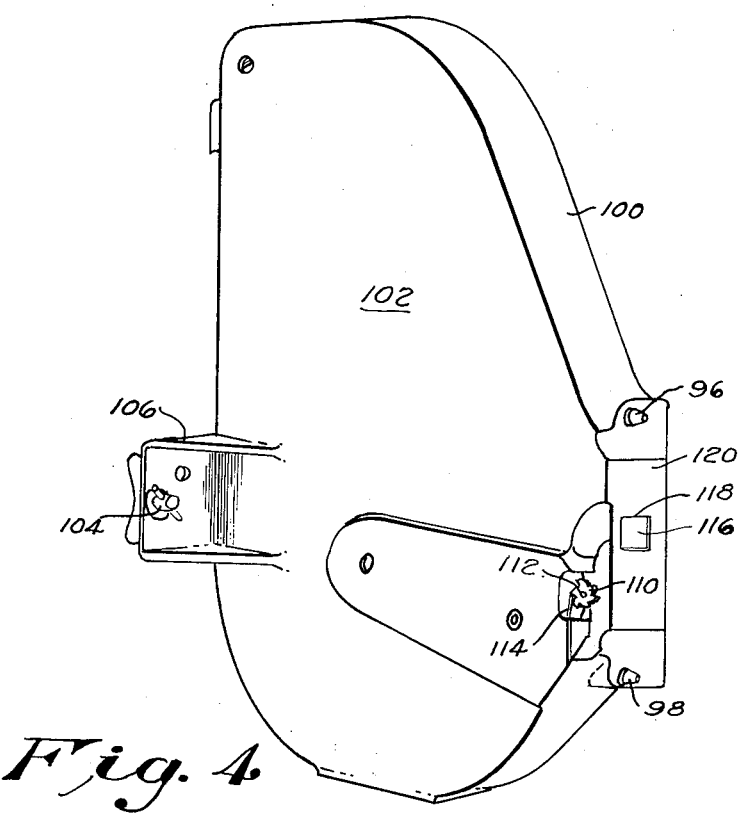
FIG. 4 is a perspective view of one side of the film magazine of the apparatus of the invention.

A pair of centering apertures 92, 94 in main housing 54 are adapted to receive respective centering studs 96, 98 of a film magazine 100, see in FIG. 4. A wall 102 of magazine 100 serves as a mating wall which is slidably received along wall 76 of main housing 54. A quick-connect fastener of any suitable type is indicated at 104 on a flange 106 of magazine 100. When magazine 100 is positioned in place against housing 54, fastener 104 is engaged in a suitable socket 108 therein. Referring now particularly to FIG. 4, a ratchet wheel 110 is shown mounted for rotation in a clockwise direction about an axle 112. A leaf spring or the like 114 prevents movement in the reverse direction, so that as a driving pawl 84 is operated in the usual oscillatory manner, ratchet wheel 110 (which is engaged thereby) is caused to execute intermittent incremental rotary motion in a clockwise direction as seen in FIG. 4. A portion of the film 116 carried by film magazine 100 may be seen through an aperture 118 in the forward face 120 of the magazine.

Referring now to FIG. 5, a supply roll of unexposed film is shown at 122, being mounted for rotation about a hub 124. The actuating rod 126 of a suitable footage indicator 128 bears against the outer periphery of roll 122. A pressure plate 130 is positioned adjacent aperture 118, and is spring-biased to press film 116 against such aperture as it passes in front of the pressure plate. A leaf spring 132 bears against a stop 134 to bias pressure plate 130 in a clockwise direction about its pivotal mount 136, which mount also serves as an axle for an idler roller 138 over which film 116 passes before entering the area of the pressure plate. A drive sprocket 140 is positioned just below pressure plate 130, and film 116 passes around such sprocket and over an idler roller 142 which is spring-biased by means not shown to press against sprocket 140. Mounted coaxially with the pivot 144 of the forked arm 146 which carries idler 142 is a spur gear 148 which engages a smaller spur gear not shown but which is secured to the rear side of sprocket 140. A pulley 150 is secured to the rear of spur gear 148, and drives a resilient member 152 which also passes over a similar pulley not shown but secured to the rear side of a hub 154 which carries a take-up spool 156. Since sprocket 140 is mounted on and is secured to axle 112 of the ratchet wheel 110, as the ratchet wheel is incrementally advanced, sprocket 140 is similarly advanced, and film 116 is drawn through the exposure region at pressure plate 130 in intermittent steps, subsequently to be taken up on spool 156.

In order to avoid undue strain and possible resulting breakage in film 116 as each incremental pull is applied thereto in advancing film through the exposure region, a spring of some suitable sheet material as indicated at 158, mounted securely to the magazine 100 at 160 and looped around a stop member 162 to determine the extent of travel of the free end thereof. Film 116 passes over the free end of spring 158, and in the absence of pulling tension in the film, a partial loop is formed therein by virtue of the resilient upward push of the spring. When the tension is increased in film 116 due to the action of sprocket 140 in advancing film through the exposure region, the resilient force of spring 158 gives way to the greater force of tension produced in part by the inertia of the supply roll 122, and a length of film approximating the loop length is drawn down. When the sprocket 140 stops between film advances, spring 158 is able to relatively slowly draw off another length of film from supply roll 122 to form another partial loop. In this manner, the sprocket 140 does not apply an abrupt pull directly on the supply roll 122, but rather merely pulls on the relatively massless partial loop of film.

FIG. 6 shows in detail the main elements of the improved and simplified shutter mechanism of the apparatus of the present invention. As may be seen, the shutter is of the sliding plate type, wherein a pair of planar plates positioned for reciprocal movement adjacent each other and with respect to each other each have an aperture therein which is of the same size and shape as the exposure aperture of the camera of which the shutter is a part. Relative sliding motion of these two plates causes controlled periods of registry of the two plate apertures with the exposure aperture of the camera, during which periods exposure of the film in the camera is effected. While it is customary to refer to the first of these plates which crosses the exposure aperture during an exposure as the "A" or first plate, and the other plate as the "B" or second plate, the description of the shutter of the present invention will refer to the front plate (that is, the plate nearer the lens system) as the first plate, and the rear plate will be called the second plate, even though the latter plate is actually the first to cross the exposure aperture. Accordingly, the language of the claims forming a part of this specification will refer to the front plate as the first plate, and the rear plate as the second plate.

Referring now to FIG. 6, the several elements are shown in a shutter set or closed position. Front or first plate 69 has an aperture 164 therein which is in alignment with the exposure aperture 38 of camera 10. A second aperture 166 in plate 69 is L-shaped to provide a latching portion 168 which is adapted to be engaged by a pivoted latch member 170. Latch 170 is spring-biased by means not shown in a counterclockwise direction about a pivot 172 so as to maintain the latch engaged to plate 69 against the forces which may be introduced by jarring or the like. First plate 69 is spring-biased as by spring 174 in an upward direction, and when latch 170 is not engaged with latching portion 168, plate 69 is free to move upwardly to a limit position under the influence of spring 174. It will be understood that the form of the spring shown is merely exemplary, and any suitable other form may be employed in order to achieve the desired result. The second plate 68 has an aperture 176 therein which is of the same size and shape as the exposure aperture 38 of the camera 10. In the set or closed position of the shutter as shown in FIG. 6, aperture 176 is completely out of alignment with exposure aperture 38, resulting in the closed condition of the shutter assembly. A camming aperture 178 in second plate 68 has a cam surface 180 which is engaged by a cam follower ear or tab 182 on latch member 170. As plate 68 is drawn upwardly by shutter drive arm 62 to initiate the action of an exposure cycle, cam surface 180 serves to push ear 182 off latching portion 168 to release plate 69 when plate 68 has reached a position of full registry of aperture 176 with exposure aperture 38. The upper limit position of plate 69 is determined by the engagement of ear 182 with the bottom of aperture 166 or by abutment of the edge of cut-out portion 184 against the tip 66 of shutter drive arm 62. It will be understood that the means for securing tip 66 to plate 68 allows a certain degree of pivotal movement between these two members so that the reciprocal sliding motion of plate 68 may be achieved.

Once the exposure has been effected, the plates 68 and 69 and arm 62 are in their uppermost positions, and cut-out portion 184 is engaged by tip 66 of arm 62. Thus, when arm 62 is returned to its initial lower position, the two plates are returned together in a capped or shutter-closed condition, since apertures 166 and 176 are not in alignment when the two plates are so relatively positioned.

Referring now to the operation of the preferred form of the apparatus of the invention, a suitable source of electrical power (not shown) is connected to the circuits between the camera 10, the shutter trip switch under treadle 16, and the electrical register 20 in toll booth 18. The particular means for effecting the electrical control of the several elements of the apparatus of the invention may be of any suitable type, and the particular form of the register 20 and the treadle switch 16 is not a part of the present invention. Of course, the elements used in a given application must function in a manner which is compatible with the essential portions of the apparatus described. Upon the application of power to the cable 22, lights 30 will be energized and the treadle switch is enabled for subsequent operation when the vehicle 14 passes thereover. As the vehicle 14 comes to a stop at the toll booth 18, the operator of the booth enters the amount of the toll for that particular transaction in the register 20 as by means of a keyboard or the like. Register 20 also is set to indicate the time and date of the transaction, as well as any other desired information such as the booth number or the like. Simultaneously with the entry of the desired information into the register and the punching of a tabulating card or the like (if one is to be made), the several components of the data display unit 4 are correspondingly actuated to display the information entered into the register. An image of the front faces of the several components of the display unit 24 is focussed by means of mirrors 32 and 34 and lens system 36 at the right-hand portion (as seen in FIG. 3) of the camera exposure aperture 38. At the remaining portion of this aperture there is focused an image of the vehicle 14 when such vehicle has reached the position of the treadle 16. That is to say, the position of camera 10 on its support 12 is such as to aim the lens system 40 at the general area of the treadle 16, so as to afford a view of the front and left side of the vehicle.

After the driver of vehicle 14 has paid the indicated toll, the vehicle leaves the toll booth 18 and shortly thereafter passes over treadle 16, thereby actuating a shutter-trip switch not shown but electrically connected to rotary solenoid 42 by means of suitable conductors in cables 17 and 22. Closing of the switch associated with treadle 16 connects solenoid 42 with a suitable source of electrical power, and the rotary element 46 is thereupon caused to rotate in a counterclockwise direction against the action of the spring 55. Such rotary motion of element 46 results in clockwise rotation of rocker arm 50 about pivot 52, with stud 44 sliding along slot 48. Since sector gear 56 on arm 50 engages spur gear 58, the latter is rotated in a counterclockwise direction, carrying with it the two pins 60 and 70.

In FIG. 2, the movable parts are shown in their initial or rest position, with crank pin 60 being on the under side of gear 58, and pin 70 on the upper half. Thus, as gear 58 rotates in a counterclockwise direction as seen in FIG. 2, crank pin 60 is carried upwardly to the right. As may better be seen in FIG. 6, this movement of gear 58 and pin 60 effects an upward movement of the tip 66 of shutter drive arm 62 as pin 60 slides along slot 61 therein (to the left as seen in FIG. 6). As tip 66 of arm 62 is drawn upwardly, the second or rear plate 68 of the shutter assembly slides up in a similar manner. As plate 68 moves up, aperture 176 approaches a position of alignment with exposure aperture 38, with respect to which aperture 164 in plate 69 is initially aligned. During the latter portion of the upward travel of plate 69, cam surface 180 thereon bears against ear or tab 182 of latch member 170, the ear initially being engaged by latching portion 168 of plate 69 and extending through the latter plate and into aperture 178 of plate 68. When plate 68 reaches the upward limit position of its vertical travel, aperture 176 is in alignment with apertures 38 and 164 to allow full opening of the shutter of camera 10. However, at or slightly before the time at which plate 68 reaches such upward limit position, latching member 170 is disengaged from latching portion 168 of plate 69 by the action of camming surface 180.

Upon the release of plate 69 from the latching member 170, such plate is free to slide upwardly under the influence of spring 174 until cutout portion 184 strikes tip 66 of shutter drive arm 62. The longer slotted portion of aperture 166 permits such movement while ear 182 is still extending through plate 69 and bearing on camming surface 180. When plate 69 reaches its upward limit position of vertical travel as defined by the position of tip 66, aperture 164 is then removed from its previous position of alignment with exposure aperture 38, and the opaque portion of plate 69 between the two apertures therein interrupts the light from the lens system 40 to terminate the exposure. At this point in the operational cycle of the camera 10, the rotary element 46 of solenoid 42 has reached the limit of its travel, and is ready to be returned to its original or re-set position under the influence of spring 55. While the "kick" given the rotary element of solenoid 42 upon momentary closing of the switch associated with treadle 16 is ordinarily sufficient to drive the rotary element through the necessary amplitude of rotary motion, to be stopped by a mechanical stop or the like, it will be apparent to those skilled in the art that special designs of rotary solenoids may be employed wherein closing of the treadle switch causes a more than momentary application of electrical energy to the solenoid, which is de-energized only upon the completion of a desired degree of rotary motion. Thus, the particular form of the solenoid employed is not a part of the invention of the present disclosure.

Referring again to FIG. 2, when gear 58 is being rotated to provide the above-described actuation of the shutter mechanism by means of the displacement of crank pin 60, a similar displacement of crank pin 70 takes place. The counterclockwise rotation of gear 58 causes pin 70 to move down and to the left as seen in FIG. 2, driving the arm 72 both downwardly and in a counterclockwise direction about pivot pin 74. Since this pin is constrained to move vertically in slot 78 in the magazine-receiving wall 76 of main housing 54, the rotation of gear 58 effects a downward movement of pin 74 in slot 78.

As may be seen in FIG. 3, this downward movement of pin 74 in slot 78 causes clockwise (in FIG. 3) rotation of drive member 80 about axis 82, and pawl 84 is displaced upwardly around the periphery of ratchet wheel 110 a sufficient amount to engage the next adjacent tooth of the ratchet wheel for subsequent incremental movement of the wheel in the well known manner.

Upon the completion of the drive stroke of solenoid 42, spring 55 is effective in returning rotary element 46 to its original position, and shutter drive arm 62 and film transport drive arm 72 are likewise returned to their initial positions. When this occurs, shutter plates 68 and 69 are returned to their initial lower limit positions by means of tip 66 on arm 62, which tip is secured to plate 68 and is engaged by cutout portion 184 of plate 69. The plates are thus returned to the re-set position in a capped or closed condition, since when tip 66 bears against cutout 184, the apertures 164 and 176 are completely out of alignment. Once the plates are returned to their starting positions, latching member 170 once again engages latching portion 168 of the front plate 69, since camming surface 180 is no longer in a position to cam latching member 170 out of the latching position.

Also during the return stroke of solenoid 42, film transport drive arm 72 is returned in an upward direction, carrying with it the pin 74, resulting in a counterclockwise rotation (in FIG. 3) of pivotal drive member 80. Such rotation of the latter member causes the lower tip of pawl 84 to engage the adjacent tooth of ratchet wheel 110 and to effect a corresponding incremental rotary motion of the latter. As seen in FIG. 4, ratchet wheel 110 is intermittently driven in a clockwise direction, being held against counterclockwise rotation by means of the engagement of the end of leaf spring 114 in the teeth of the wheel.

Referring again to FIG. 5, the above-described rotation of ratchet wheel 110 results in an incremental clockwise rotation of drive sprocket 140, by means of which film 116 is advanced downwardly through the exposure area by the amount of the vertical height of an exposure frame. Each of the incremental advances of film 116 is somewhat less than the amount of film included in the loop formed by the spring 158. In this manner, as sprocket 140 pulls an incremental length of film past the pressure plate 130, all or most of the film advanced immediately comes from the partial loop, rather than from the supply roll 122 directly. Between the intermittent actuations of sprocket 140, spring 158 serves to draw off another loop of film 116 in a gradual manner from supply 122. After film 116 passes over sprocket 140 and between the sprocket and the idler roller 142, it is taken up on a spool 156 which is driven by resilient member 152, which may conveniently take the form of an endless coil spring or the like, and which provides a slipping take-up arrangement to allow for the varying size of the takeup roll as more and more film is added thereto in a manner well known to those skilled in the art.

The invention has been described above in considerable detail, and particularly with reference to its application to the monitoring of the transactions at a highway toll booth. However, it will be apparent to those skilled in the art that the invention is also applicable to many other applications wherein it is desired to record the passage of persons or objects through a control area or past a check point (such as in the monitoring of the entrance and egress of personnel working in an area of controlled access), along with certain data which are pertinent to the persons or objects so passing as well as other related data. Further, the shutter-trip switch need not be mechanically operated as by the treadle shown and described herein, but may instead be any other suitable operating means such as, for example, a photoelectric cell and a cooperating light source. Hence, the invention is not to be considered as limited to the particular details given, nor to the specific application to which reference has been made during the description of the apparatus, except insofar as may be required by the scope of the appended claims.

What is claimed is:

1. Photographic apparatus for simultaneously recording on a single photographic film both a visual scene and visual display information related to such scene, comprising a main housing and a film magazine slidably received along a wall thereof and releasably secured thereto, a drive member mounted on said magazine-receiving wall for driving motion in a plane substantially parallel to such wall, motive power means in said main housing, motion transmitting means interconnecting said drive member and said motive power means to drive the former, a driven member carried by a mating wall of said magazine and adapted to lie substantially in said plane and to engage said driving member when said magazine is secured to said main housing, means for mounting a supply roll of film in said magazine, a film transport mechanism connected to and driven by said driven member to move successive frames of such film into registry with an exposure aperture in said main housing, said main housing containing a first optical means for focusing light from such scene on a portion of the area of said exposure aperture, visual display means within said main housing for displaying such related information, second optical means within said main housing for focusing light from said visual display means on another portion of the area of said exposure aperture, and shutter means within said main housing connected to said motion transmitting means and operated thereby to interrupt the light from said first and second optical means except during exposure of such film.

2. A camera comprising a main housing and a film magazine slidably received along a wall thereof and releasably secured thereto, an oscillating drive member pivotally mounted on said magazine-receiving wall, a pawl member pivotally mounted on said drive member for pivotal movement in a plane substantially parallel to said magazine-receiving wall, resilient means connected between said pawl member and said drive member to urge said pawl member toward a limit position of pivotal movement with respect to said drive member, motive power means in said main housing, motion transmitting means interconnecting said drive member and said motive power means to effect oscillatory movement of the former upon energization of the latter, a ratchet wheel carried by a mating wall of said magazine and mounted for rotation in one direction in a plane substantially parallel to said mating wall, said pawl engaging said ratchet wheel when said magazine is secured to said main housing, means for mounting a supply roll of film in said magazine, a film transport mechanism connected to and driven by said ratchet wheel to move successive frames of such film into registry with an exposure aperture in said main housing, optical means on said main housing for focusing an image at said exposure aperture, and shutter means in said main housing connected to said motion transmitting means and operated thereby to interrupt light passing through said optical means except during exposure of such film.

3. A camera in accordance with claim 2, and including a resilient film guide in said magazine positioned to bear against such film so as to deflect the same from its normal path to form a partial loop therein between such supply roll and said film transport mechanism in the absence of tension in such film.

4. Photographic apparatus in accordance with claim 2, wherein said shutter means includes a pair of a parallel planar plates of opaque material each having an aperture therein of substantially the same size as said exposure aperture and being mounted for reciprocal sliding motion in its own plane between a pair of limit positions, latch means operable to engage a latching portion of a first of said plates when such plate is in a first limit position wherein the aperture in said first plate is in registry with said exposure aperture, resilient means connected to said first plate to urge the same toward the other of said limit positions at which other position an opaque portion of said first plate is in registry with said exposure aperture, said latch means serving to hold said first plate against the action of said resilient means, shutter drive means interconnecting said motion transmitting means and the second of said plates and operable on shutter-trip stroke to move said second plate from a first limit position wherein an opaque portion of such plate is in registry with said exposure aperture to a second limit position wherein the aperture in said second plate is in registry with said exposure aperture, and cam means on said second plate operable to disengage said latch means from said latching portion of said first plate when said second plate is brought into its second limit position, said shutter drive means also engaging a portion of said first plate on return stroke whereby said plates are returned to their first limit positions simultaneously.

5. Photographic apparatus of the type for simultaneously recording on a single photographic film both a visual scene and visual display information related to such scene, comprising a main housing and a film magazine slidably received along a wall thereof and releasably secured thereto, visual display means within said housing, a drive member mounted on said magazine-receiving wall for driving motion in a plane substantially parallel to such wall, motive power means in said main housing, intermittent motion transmitting means interconnecting said drive member and said motive power means to drive the former from the latter, a driven member carried by a mating wall of said magazine and adapted to lie substantially in said plane and to engage said drive member when said magazine is secured to said main housing, said driven member being thereby given an intermittent motion from said drive means, means for mounting a supply roll of film in said magazine, a film transport mechanism connected to and driven by said driven member to move successive frames of such film into registry with an exposure aperture in said main housing, first optical means in said main housing for focussing light from such scene on a portion of the area of said exposure aperture, second optical means in said main housing for focussing light from said visual display means on another portion of the area of said exposure aperture, and shutter means in said main housing connected to said motion transmitting means and operated thereby to interrupt the light from said first and second optical means in timed relation to the drive member.

6. Photographic apparatus of the type for simultaneously recording on a single photographic film both a visual scene and visual display information related to such scene, comprising a main housing and a film magazine slidably received along a wall thereof and releasably secured thereto, visual display means within said main housing, said main housing also containing at least the following: a drive member mounted upon said magazine receiving wall for driving motion in a plane substantially parallel to such wall, motive power means for said drive member, intermittent motion transmitting means interconnecting said drive member and said motive power means to drive the former from the latter, an exposure aperture, a first optical means for focussing light from such scene on a portion of the area of said exposure aperture, a second optical means for focussing light from said visual display means on another portion of the area of said exposure aperture, a shutter means connected to said motion transmitting means and operated thereby to interrupt the light from said first and second optical means in timed relation to the drive member, said film magazine having at least a driven member carried by a mating wall of said magazine and adapted to lie substantially in said plane and to engage said drive member of said main housing when said magazine is secured to said main housing, said driven member being thereby connected for intermittent motion from said drive means, means for mounting a supply roll of film in said magazine, a film transport mechanism connected to and driven by said driven member to move successive frames of such film into registry with said exposure aperture in said main housing, and means to form a partial free loop of film between said supply roll and said film transport mechanism in the absence of tension in such film.

References Cited in the file of this patent

UNITED STATES PATENTS

| | | |
|---|---|---|
| 1,347,676 | Bowdish | July 27, 1920 |
| 1,933,562 | Michel | Nov. 7, 1933 |
| 2,011,350 | Wittel | Aug. 13, 1935 |
| 2,175,538 | Morsbach et al. | Oct. 10, 1939 |
| 2,320,350 | Riccio | June 1, 1943 |
| 2,619,402 | McCutcheon | Nov. 25, 1952 |
| 2,621,570 | Kesel et al. | Dec. 16, 1952 |
| 2,653,507 | Riles et al. | Sept. 29, 1953 |
| 2,671,390 | Smith | Mar. 9, 1954 |
| 2,736,630 | Cooper | Feb. 28, 1956 |

FOREIGN PATENTS

| | | |
|---|---|---|
| 653,576 | Germany | Nov. 27, 1937 |